Figure 1:
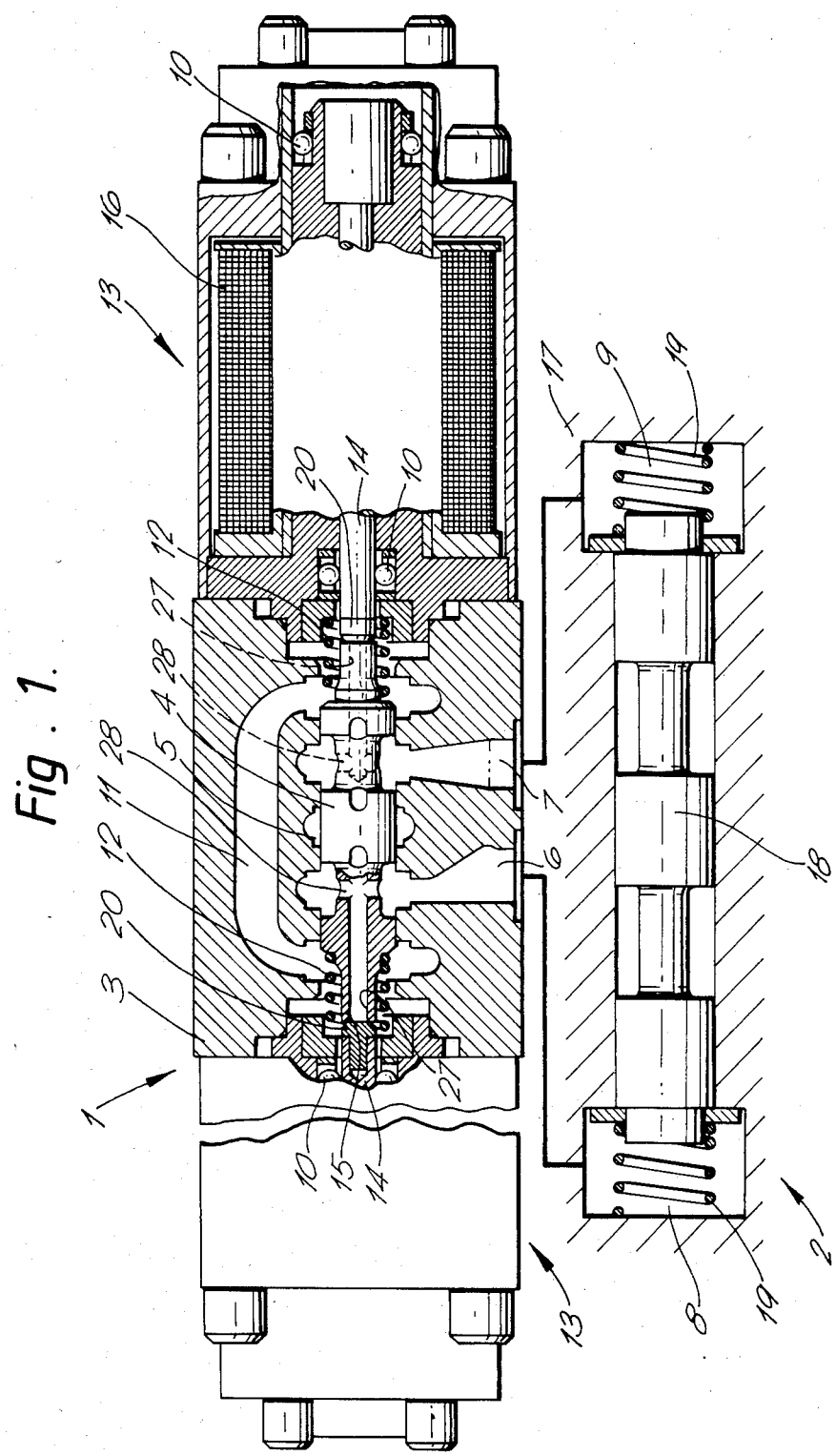

United States Patent [19]

Hammond et al.

[11] Patent Number: 4,615,358
[45] Date of Patent: Oct. 7, 1986

[54] PILOT VALVES FOR TWO-STAGE HYDRAULIC DEVICES

[75] Inventors: John A. G. Hammond, Frinton-on-Sea; Andrew C. Morley, Emsworth, both of England

[73] Assignee: Vickers, Incorporated, Troy, Mich.

[21] Appl. No.: 615,143

[22] Filed: May 30, 1984

[30] Foreign Application Priority Data

Jun. 1, 1983 [GB] United Kingdom ............... 8315079

[51] Int. Cl.[4] .......................................... F15B 13/043
[52] U.S. Cl. ......................... 137/625.63; 137/596.17; 137/625.64; 137/625.65; 137/625.68
[58] Field of Search ..................... 137/596.17, 625.63, 137/625.64, 625.65, 625.68

[56] References Cited

U.S. PATENT DOCUMENTS 2,591,800  4/1952  Gardiner ................... 137/625.64 X
3,450,160  6/1969  Tess ........................... 137/625.64
3,851,285  11/1974  Rothfuss et al. ........... 251/129.15 X
4,245,671  1/1981  Kosugui ...................... 137/625.64
4,266,572  5/1981  Schuttenberg et al. ... 137/628.64 X Primary Examiner—Gerald A. Michalsky
Attorney, Agent, or Firm—Barnes, Kisselle, Raisch, Choate, Whittemore & Hulbert

[57] ABSTRACT

A solenoid-operated pilot valve for a two stage hydraulic device comprises a spool (4) slidably mounted in a housing for movement in opposite directions from a normal null position in order to deliver fluid under pressure to the second stage (2) of the device to actuate the latter in one direction or an opposite direction from a normal null position, the spool (4) being formed with two passageways (27,28) each extending internally of the spool (4) between one end face (15) of the latter and the periphery of the spool, and the pilot valve further comprising two spool control devices (13), at least one of which is a solenoid, associated with respective ends of the spool and in normal operation seating against the end faces (15) of the spool so as to close the passageways against fluid flow therethrough, but becoming unseated in the event of an interruption in the electrical input to the solenoid, whereby both ends of the second stage are at a common pressure so as quickly to relieve the pressure in the second stage of the device, thereby permitting fast return of the latter to the null position.

12 Claims, 5 Drawing Figures

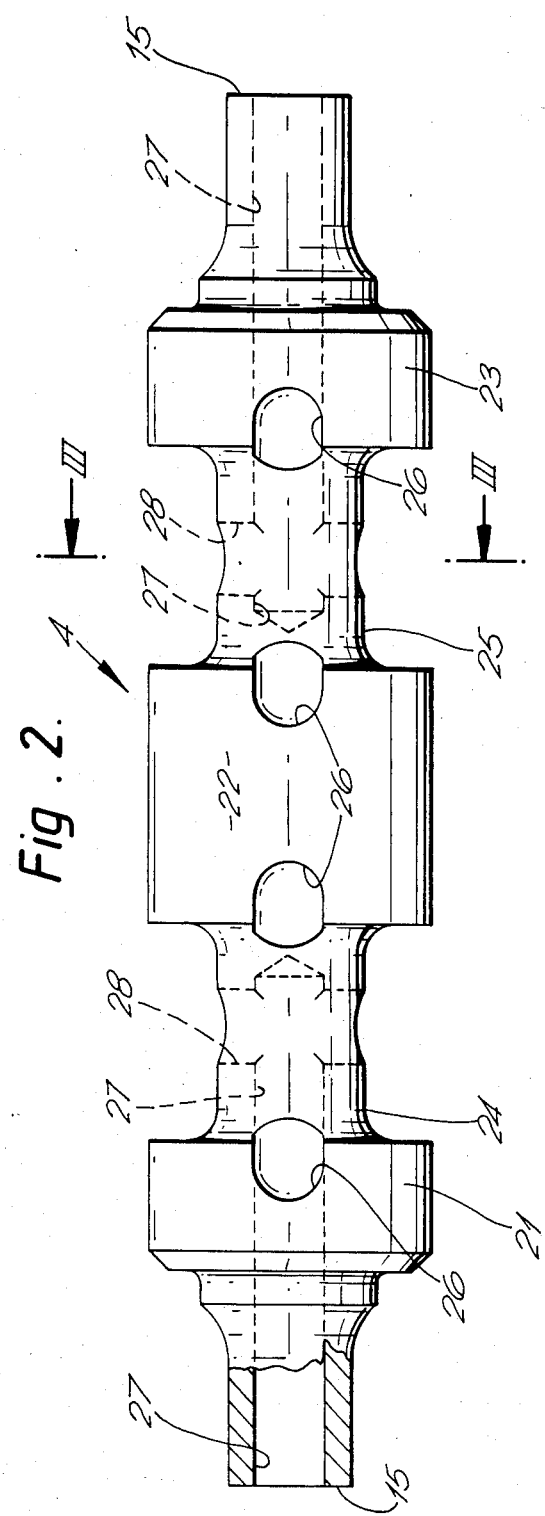
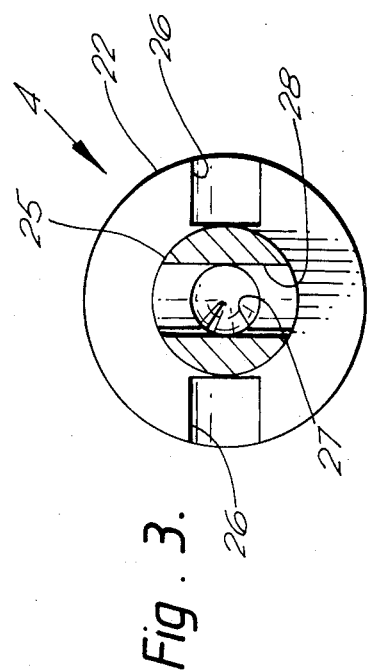

PILOT VALVES FOR TWO-STAGE HYDRAULIC DEVICES

This invention relates to two-stage hydraulic devices more particularly, although not exclusively, to two-stage proportional hydraulic valves.

One basic problem with known two-stage proportional valves is that the main stage does not return to null with sufficient speed to avoid a potentially hazardous condition when the pilot valve is shut off in an emergency or by an interruption in the electrical supply thereto. This is because the spool of the main stage, assuming it is offset and not in the normal central (null) position when the emergency arises, has to force hydraulic fluid from the pressurised control chamber thereof, through the underlapped orifices of the pilot valve and thence to tank or reservoir. The underlapped orifices are, of course, relatively small and this coupled with the fact that the force of the centring springs for the main stage spool produce a relatively low pressure differential across the underlapped orifices of the pilot valve spool means that centring of the main stage spool can take several seconds. If, as a result of the emergency, the main stage has been placed in a hardover position, then serious damage can be caused to the machinery and/or workpiece being controlled by the valve if corrective action is not taken quickly.

It is thus necessary to provide an alternative flow path to common the control pressures in the event of an emergency so that fluid under pressure in the main stage can be relieved quickly, whereby the main stage will be nulled or centred quickly.

Solutions to the problem under discussion have been proposed and these have included the provision of an auxiliary dump valve, the provision of an additional spring offset dump position on the pilot spool, and the provision of a spring separated, split spool which increases orifice size to provide the desired alternative flow path so as to effect rapid release of hydraulic fluid from the main stage. These previous proposals all have disadvantages: the dump valve involves extra cost and space; the spring offset dump position limits the pilot valve design to an assymetrical single solenoid type with inherent loss in pilot valve performance, and the split spool whilst basically good is a little sophisticated and is thus too expensive for inclusion in more basic, cheaper valves.

According to the present invention a solenoid-operated pilot valve for a two-stage hydraulic device comprises a spool slidably mounted in a housing for movement in opposite directions from a normal null position in order to deliver fluid under pressure to the second stage of the device to actuate the latter in one direction or an opposite direction from a normal null position, and two spool control devices, at least one of which is a solenoid, associated with respective ends of the spool characterised in that the spool is formed with two passageways each extending internally of the spool between one end face of the latter and the periphery of the spool, in normal operation of the valve, the control devices seating against the end faces of the spool so as to close the passageways against fluid flow therethrough, but becoming unseated in the event of an interruption in the electrical input to the solenoid, whereby both ends of the second stage are at a common pressure so as quickly to relieve the pressure in the second stage of the device, thereby permitting fast return of the latter to the null position.

Thus the present invention achieves rapid relief of hydraulic fluid from the main stage to allow fast nulling of the latter by a very simple, but highly effective expedient of providing two internal passageways in the spool of the pilot valve which otherwise remains conventional. The machining necessary to produce these passageways is minimal and straightforward so that the attendant increase in manufacturing costs is insignificant. Furthermore, the normal nulling adjustments to set the de-energised characteristic of a spring-centred pilot valve are not required.

The second stage of the hydraulic device may be a further hydraulic valve or an hydraulic actuator or other device which operates from a null position.

Conveniently, each passageway has a first portion extending axially of the pilot valve spool from the associated end face thereof, and a second portion extending from the inner end of the first portion to the periphery of the spool. The second passageway portion may extend radially or otherwise of the pilot valve spool. In order to increase the pressure-relieving function of the passageways, the second portions thereof may extend from one side of the spool to the other either along a diameter or a chord.

Figure 4:
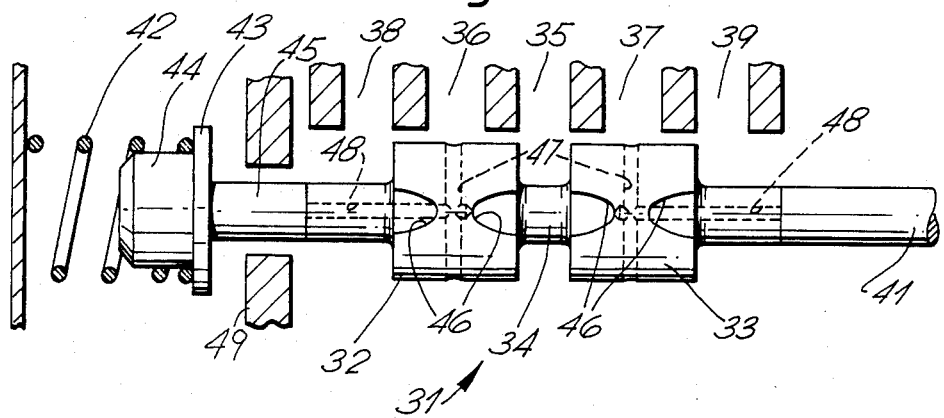
Figure 5:
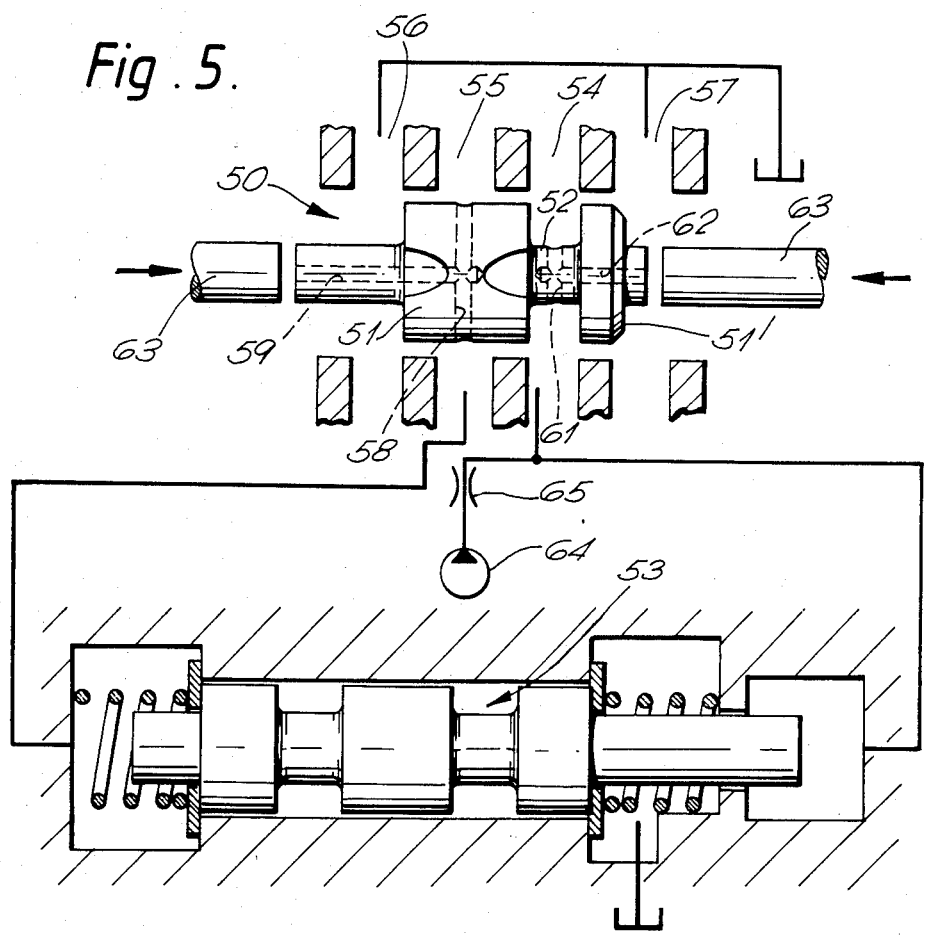

Two-stage proportional valves in accordance with the present invention will now be described in greater detail, by way of example, with reference to the accompanying drawings in which:

FIG. 1 is a side view, partly in section, of one valve,
FIG. 2 is an enlarged view of a component of FIG. 1
FIG. 3 is a section on the line III—III of FIG. 2,
FIG. 4 is a diagrammatic cross-section of part of an alternative pilot valve, and
FIG. 5 is a diagrammatic cross-section of part of a further alternative pilot valve arranged to drive a differential device.

Referring to FIG. 1, the two-stage proportional valve is basically of conventional design in that it comprises a solenoid-operated pilot valve 1 hydraulically connected to a main valve 2. The pilot valve 1 comprises a housing 3 and an underlapped four-way spool 4 (shown in greater detail in FIGS. 2 and 3) slidably mounted in the housing. The housing 3 is provided with an inlet or pressure port 5 through which hydraulic fluid under pressure is supplied, two service or control ports 6 and 7 connectible to respective end chambers 8 and 9 of the main valve 2, and a channel or loop 11 connecting the ends of the spool 4 to tank or reservoir (not shown). The spool 4 is slidable in one direction or the opposite direction from a normal null or central position (shown in FIG. 1), to which it is urged by centring springs 12, by two solenoids 13 associated with respective ends of the spool 4. Each solenoid 13 comprises an armature rod or push pin 14 slidably mounted in bearings 10 in the housing 3 and normally in fluid sealing contact with the associated end face 15 of the spool 4, and a coil 16. Each rod 14 has an insert 20 of softer material to prevent damage should the rod and spool 4 "snap" together during operation.

The main valve 2 comprises a housing 17 in which the end chambers 8 and 9 are formed and which slidably houses a spool 18 normally positioned in the null or central position by centring springs 19 housed in the respective end chambers. The outlet port of the main valve to which the load is connectible is not shown but can be of any known arrangement.

Returning to the spool 4 of the pilot valve and referring to FIGS. 2 and 3, the spool is of known form, in that it comprises three lands 21, 22 and 23 separated by two waisted portions 24 and 25, and is provided with a plurality of notches 26 in the lands to effect the necessary underlapped characteristics of the pilot valve, but differs from conventional spools in that two internal passageways are formed therein. Each passageway comprises a first portion in the form of a blind bore 27 extending from one end face 15 of the spool to the waisted portion 24 or 25 adjacent that end face, and a second portion in the form of a diametral bore 28 in the waisted portion, which bore intersects the bore 27. Thus each passageway 27, 28 provides a flow path for hydraulic fluid from the periphery of the spool to the respective ends of the spool 4. Since the waisted portions overlap to a greater or lesser extent, depending on the position of the spool 4, the respective outlet or control ports 6 and 7, and since the latter communicate with the end chambers 8 and 9 of the main valve 2, then the passageways 27, 28 also provide a flow path for hydraulic fluid from the ends of the main valve to the corresponding ends of the pilot valve 1, when open, and thence to tank via the tank loop 11.

The two solenoids 13 are preferably arranged to be driven by a pulse-width-modulated control circuit such as that disclosed in European Patent Application No.82.306499.3 which employs differential current feedback in an amplifier controlling the solenoids. With this arrangement, any interruption in the electrical supply to one of the solenoid coils 16 automatically causes an interruption in the supply to the other coil, whereupon the springs 12 immediately centre or null the spool 4 since no control thereof is now effected by the solenoids which, on becoming de-energised, are retracted virtually simultaneously from the end faces 15 of the spool, thereby opening the passageways 27, 28 which are otherwise sealed by the solenoid push pins 14. The retraction of the solenoid push pins 14 is effected by the fluid under pressure in the passageways 27, 28. With the passageways 27, 28 open, the two end chambers 8 and 9 of the main valve 2 are placed at the same pressure (in this embodiment connected to tank via the loop 11), thus allowing the springs 19 rapidly to null or centre the main valve spool 18 since these springs do not have to overcome any resistance normally offered by the hydraulic fluid trying to escape from the main valve through the small orifices afforded by the notches 26 in the pilot valve spool 4.

This re-centring or nulling of the main valve spool 18 is extremely rapid and fail safe whereas previously it could take several seconds. Such a long nulling time can be hazardous since the main valve is uncontrolled during this period and can be in a hardover position. It will be appreciated that the provision of the passageways 27, 28 involves only a relatively simple machining operation so that the manufacturing costs associated therewith are insignificant. Furthermore it is not necessary for accurate nulling of the pilot valve spool 4 to have occurred before the main spool pressure can be relieved. Indeed, even if the pilot valve spool 4 were jammed in an offset position for some reason (for example the spool is silted or contaminated) fluid under pressure would still be relieved from the main valve 2.

It has been found practical to use the same diameter for the bores 27 and 28 but differential sizing could be employed. It is desirable to make the cross-sectional areas of the bores 27 and 28 as large as possible, consistent with structural strength of the spool 4. Furthermore, the bores 27 need not be axially-extending and the bores 28 need not extend diametrically, the only requirement being the provision of separate internal flow paths between the periphery of the pilot valve spool and the end faces of the spool, with the cross-sectional area of the total flow path being sufficient to allow pilot leakage to tank with a back pressure low enough to prevent the main stage lifting off its centring springs.

Turning now to FIG. 4, this shows a four-way pilot valve having a spool 31 provided with two lands 32 and 33 and a single waisted portion 34 disposed between the lands. The pilot valve has an inlet or pressure port 35, two service or control ports 36 and 37, and two tank ports 38 and 39, these ports being shown only diagrammatically on one side of the spool 31. Although the spool 31 can be operated by two solenoids as in the embodiment of FIGS. 1 to 3, it is shown as cooperating with a solenoid armature rod or push pin 41 at one end, and a spring offset arrangement at the other end. The spring offset arrangement comprises a compression spring 42 operating between the housing of the pilot valve and an abutment 43 on a spigot having a larger diameter portion 44 which receives one end of the spring, and a smaller diameter portion 45 which acts, in effect, as a dummy solenoid rod or push pin.

The periphery of each land 32 and 33 is formed with notches 46 to effect the necessary underlapped characteristics of the valve and is also formed with a diametral bore 47 which intersects a blind bore 48 provided axially of the spool from the associated end thereof. The bores 47 and 48 form passageways equivalent to those referenced 27 and 28 in the embodiment of FIGS. 1 to 3.

The pilot valve is shown in the operational null position in FIG. 4 which means that the solenoid is supplied with a standing current sufficient to hold the spool 31 in the null position against the action of the spring 42 which otherwise would move the spool to the right and hence out of the null position. Thus the bores 48 of the passageways 47, 48 are sealed by the solenoid push pin 41 and the dummy push pin 45, respectively. If the pilot valve is required to move to the left from the null position of FIG. 4, the solenoid current is increased and the push pin 41 moves the spool to the left and hence compresses the spring 42 still further. Fluid under pressure then flows from the pressure port 35 to the service port 36 thence to the main valve of other device being operated by the pilot valve. Alternatively, if the standing current at null on the solenoid is decreased, the spring 42 moves the spool 31 to the right as seen in FIG. 4 and the pressure port 35 is connected to the service port 37.

Should the solenoid go open circuit, the push pin 41 will be free to move from the associated end of the spool 31, thereby unsealing the bore 48, and the spring 42 will move the spool to the right until the abutment 43 engages the stop member 49, whereupon the sealing connection between the dummy push pin 45 and the other end of the spool can be broken so that both ends of the main valve are then at a common (tank) pressure thus allowing the main valve to centre or null very rapidly. The pressure of the fluid in the passageways will normally be sufficient to break the seal between the push pins 41 and 45 and the respective ends of the spool 31 once the spool is free to float between the two push pins. Accordingly, this embodiment of the invention also affords rapid fail-safe operation of the main valve, or other device being driven by the pilot valve. However, it is noted that in the event of the pilot valve spool 31 becoming jammed due to silting or contamination, for example, the bore 48 associated with the dummy push pin 45 is likely to remain sealed by the latter, whereby the ends of the main valve or other device will not be placed at common pressure.

Turning now to FIG. 5, this shows a three-way pilot valve having a spool 50 formed with two lands 51 and 51' with a waisted portion 52 therebetween, the valve driving a differential spool or cylinder 53. The valve has a pressure port 54, a service or control port 55 and two tank ports 56 and 57. In accordance with the invention, passageways are formed between the respective ends of the spool 51 and the periphery thereof, the passageways being made up of a diametral bore 58 in the land 51 which intersects a blind axial bore 59 from one end of the spool, and a diametral bore 61 in the spool 50 which intersects a blind axial bore 62 from the other end of the spool. The spool 50 may be controlled either by two solenoids (as in the embodiment of FIGS. 1 to 3), or by one solenoid and a spring offset device (as in the embodiment of FIG. 4) and FIG. 5 merely illustrates in general push pins 63 associated with respective ends of the spool. In as much as the pressure port 54 will communicate with tank in the failed condition of the valve, fluid under pressure supplied from a pump 64 is first passed through a fixed orifice 65 to restrict the pressure of the fluid supplied to the valve. The valve operates generally in a manner similar to that described in respect of the embodiment of FIGS. 1 to 3 when two solenoids are employed, and in respect of the embodiment of FIG. 4 when one solenoid and one spring offset device are employed.

As with the embodiment of FIGS. 1 to 3, bores of the same diameter can be used for the passageways of the embodiments of FIGS. 4 and 5, although differential sizing could be employed. Furthermore, the bores 48, 59 and 62 need not be axially-extending and the bores 47, 58 and 61 need not extend diametrically, the only requirement being the provision of separate internal flow paths between the periphery of the pilot valve spool and the end faces of the spool, with the cross-sectional area of the total flow path being sufficient to allow pilot peakage to tank with a back pressure low enough to prevent the main stage lifting off its centring springs.

All of the illustrated pilot valves can be used with a main or second stage which is other than another spool valve. Furthermore, the pilot valve does not have to be of the proportional type, i.e. it may be of the so-called bang-bang type.

The failsafe function of the illustrated valves produced by the fast centring of the main stage irrespective of the operating condition of the pilot valve can be achieved by arranging for the end chamber pressure of the main valve or stage to be commoned by the provision of the internal passageways in the respective spools, the commoning of these pressures not necessarily involving a connection to tank.

It will be appreciated that a spring offset device may be used in place of one of the solenoids in the embodiment of FIGS. 1 to 3.

What is claimed is:

1. A solenoid-operated, proportional control pilot valve for a two-stage hydraulic device comprises a housing, a bore formed in the housing, an inlet port, at least one service outlet port and two tank outlet ports also formed in the housing and communicating with said bore, a spool slidably mounted in said bore for movement in opposite directions from a normal null position in order to control fluid flow from the inlet port to a selected outlet port so as to deliver fluid under pressure to the second stage of the device to actuate the latter in one direction or an opposite direction from a normal null position, the spool being formed with two passageways each extending interanlly of the spool between one end face of the latter and different points on the periphery of the spool, and the pilot valve further comprising two spool control devices, at least one of which is a solenoid, associated with respective ends of the spool, said solenoid being operated form a source of electrical control signals, the magnitide of which is proportional to the movement of the pilot valve spool and hence to the flow of fluid from the pilot valve, said control devices in normal operation seating against the end faces of the spool, when electric input is applied to the solenoid, to close the passageways against fluid flow therethrough, and becoming unseated when electrical input is interrupted to the solenoid whereby both ends of the second stage are at a common pressure so as quickly to relieve the pressure in the second stage of the device, thereby permitting fast return of the latter to the null position.

2. A pilot valve according to claim 1, wherein each passageway has a first portion extending generally longitudinally of the spool from one end face thereof, and a second portion extending from the periphery of the spool to the first portion.

3. A pilot valve according to claim 2, wherein the first postion of each passageway extends axially of the spool and the second portion extends radially thereof.

4. A pilot valve according to claim 2, wherein the second portion of each passageway spans the spool.

5. A pilot valve according to claim 4, wherein the second portion of each passageway extends diametrically of the spool.

6. A pilot valve according to any of the preceding claims, wherein nulling of the second stage is effected on failure of the electrical input to at least one solenoid irrespective of the operational position of the pilot valve spool and irrespective of whether the pilot valve spool is jammed in a given operational position.

7. A pilot valve according to claim 1 wherein each solenoid has our armative rod supported in bearings for longitudinal sliding movement.

8. A pilot valve according to claim 1 wherein said spool comprises three lands separated by two waisted portions, each said passageway extending to the periphery of a respective waisted portion.

9. A pilot valve according to claim 1 wherein said spool comprises two lands and a waisted portion therebetween, each said passage extending to the periphery of a respective land.

10. A pilot valve according to claim 1 wherein said spool comprises two lands and a waisted portion therebetween, one of said passages extending to the periphery of a land and the other of said passages extending to the periphery of the waisted portion.

11. A pilot valve according to claim 1 in combination with a main stage valve connected to the outlet ports of the pilot valve to form a two-stage hydraulic device.

12. The pilot valve set forth in claim 11 wherein said main stage valve comprises a spool valve.

* * * * *